Patented Dec. 12, 1922.

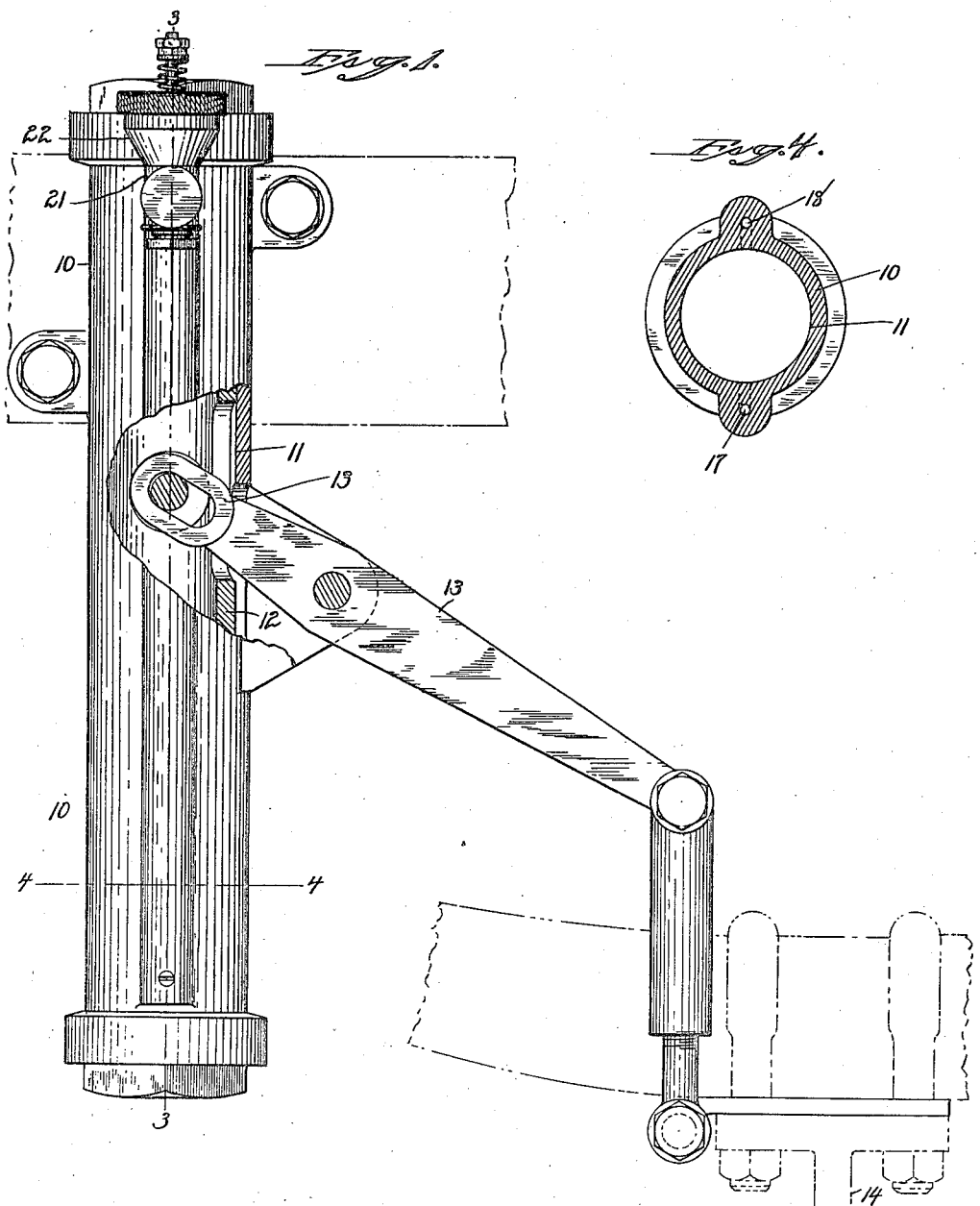

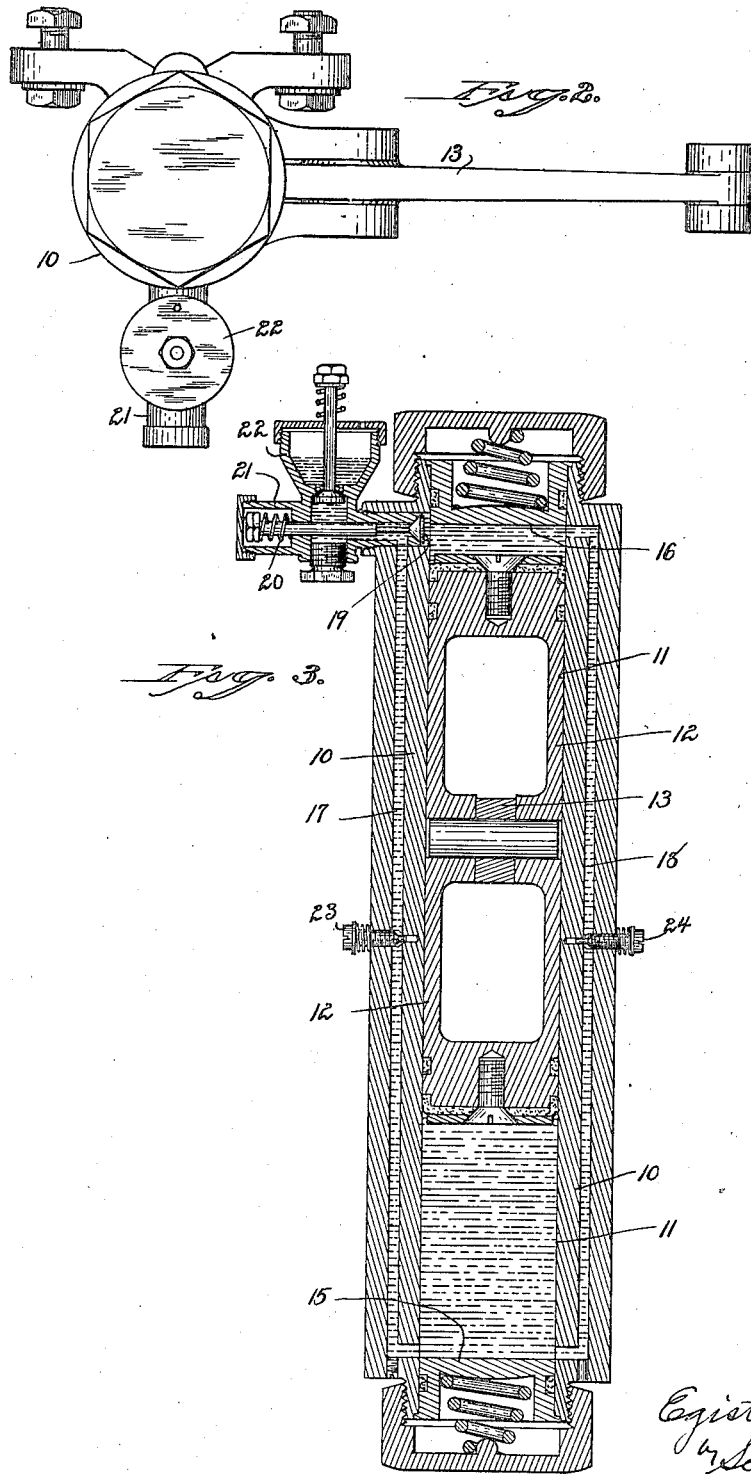

1,438,696

UNITED STATES PATENT OFFICE.

EGISTO CINQUINI, OF NEW HAVEN, CONNECTICUT.

SHOCK ABSORBER.

Application filed September 13, 1921. Serial No. 500,404.

*To all whom it may concern:*

Be it known that I, EGISTO CINQUINI, a citizen of the United States, residing at New Haven, in the county of New Haven and State of Connecticut, have invented a new and useful Improvement in Shock Absorbers; and I do hereby declare the following, when taken in connection with the accompanying drawings and the characters of reference marked thereon, to be a full, clear, and exact description of the same, and which said drawings constitute part of this application, and represent, in—

Fig. 1 a side view of a shock absorber constructed in accordance with my invention.

Fig. 2 a top or plan view of the same.

Fig. 3 a sectional view on the line 3—3 of Fig. 1.

Fig. 4 a sectional view on the line 4—4 of Fig. 1.

This invention relates to improvement in shock absorbers, and particularly to shock absorbers adapted for motor vehicles and which are of the hydraulic type and which include a piston moving back and forth in a cylinder which contains a certain amount of liquid material.

The object of this invention is to provide a simple construction by which the liquid is readily controlled and the flow adjusted according to the requirements of the vehicle to which the devices are applied, and the invention consists in the construction as will be hereinafter described and particularly recited in the claims.

In carrying out my invention, I employ a cylinder 10 adapted to be connected with a vehicle body and formed with a central bore 11 in which a piston 12 travels, this piston being moved by a lever 13 connected with it through a clearance slot 25 in the cylinder and pivotally mounted at a point between the cylinder and vehicle-axle 14, with which the lever 13 is connected. In the bottom of the cylinder is a spring-cushion 15 and at the top of the cylinder is a similar spring-cushion 16. On one side of the cylinder is a passage 17 connecting the upper and lower ends of the cylinder and on the opposite side is a similar passage 18. The opening of the passage 17 at the top of the cylinder is controlled by a valve 19 normally held in its closed position by a spring 20 mounted in a valve casing 21, which may include a filling-cup 22.

In the passage 17 is an adjusting-screw 23 and in the passage 18 is a similar screw 24. It will be understood that the cylinder is filled, or partially filled, with a suitable fluid material. When the piston moves upward, the valve 19 is closed, so that no liquid can enter the upper end of the passage 17, but must be forced downward through the passage 18 into the bottom of the cylinder, so that the upward movement of the piston is relatively slow. On the other hand, when the piston moves downward, the liquid can move upward through both the passages 17 and 18, and hence the piston can move more rapidly and, therefore, recover or assume its normal position more quickly. The screws 23 and 24 adjust the flow of liquid through the passages 17 and 18, so that the operation of the device is closely adjusted to the load.

It will be understood that the method of mounting the cylinder and the means for moving the piston therein will vary according to the type of vehicle to which the device is applied, and, therefore, I do not wish to be understood as limiting my invention to the exact construction shown.

I claim:

1. A shock absorber, comprising a cylinder-casing formed with a longitudinal bore, a passage through the casing on opposite sides connecting the opposite ends of the cylinder, a check-valve at the upper end of one of said passages, a piston longitudinally movable in the said cylinder and a lever extending through the case into engagement with the piston.

2. A shock absorber, comprising a casing formed with a cylindrical chamber, said chamber closed at opposite ends, longitudinal passages on opposite sides connecting the opposite ends of the cylinder, a check-valve at the upper end of one of said passages, a piston in said cylinder, and a lever extending through the casing into engagement with the piston.

3. A shock absorber, comprising a cylinder closed at opposite ends and provided at opposite ends with spring-cushions, a piston in said cylinder, a lever extending through the casing into engagement with the piston and adapted to move the piston back and forth therein, passages connecting the opposite ends of the cylinder, a check-valve closing the upper end of one of the said passages, and adjusting-screws regulating the flow of liquid through the said passages.

In testimony whereof, I have signed this specification in the presence of two subscribing witnesses.

EGISTO CINQUINI.

Witnesses:
 WILLIAM VERDI,
 JOHN J. CUANELLO.